(12) United States Patent
Gray

(10) Patent No.: US 11,904,796 B2
(45) Date of Patent: Feb. 20, 2024

(54) SEAT BELT PRETENSIONER SYSTEM

(71) Applicant: Joyson Safety Systems Acquisition LLC, Auburn Hills, MI (US)

(72) Inventor: Mark Gray, Macomb, MI (US)

(73) Assignee: Joyson Safety Systems Acquisition LLC, Auburn Hills, MI (US)

(*) Notice: Subject to any disclaimer, the term of this patent is extended or adjusted under 35 U.S.C. 154(b) by 169 days.

(21) Appl. No.: 17/176,468

(22) Filed: Feb. 16, 2021

(65) Prior Publication Data
US 2021/0253059 A1 Aug. 19, 2021

Related U.S. Application Data

(60) Provisional application No. 62/976,918, filed on Feb. 14, 2020.

(51) Int. Cl.
*B60R 22/195* (2006.01)

(52) U.S. Cl.
CPC ...... *B60R 22/1954* (2013.01); *B60R 22/1952* (2013.01)

(58) Field of Classification Search
CPC ................ B60R 22/1952; B60R 22/1954
See application file for complete search history.

(56) References Cited

U.S. PATENT DOCUMENTS

| | | | | |
|---|---|---|---|---|
| 3,024,592 A * | 3/1962 | Leaman | ................. | F42B 3/006 89/1.51 |
| 4,008,780 A * | 2/1977 | Bendler | ............. | B60R 22/1955 297/480 |
| 4,054,032 A * | 10/1977 | Patrichi | ................... | F15B 15/19 60/632 |
| 4,152,025 A * | 5/1979 | Bendler | ............. | B60R 22/1955 297/480 |
| 4,917,210 A * | 4/1990 | Danicek | ............. | B60R 22/1952 280/806 |
| 5,519,997 A * | 5/1996 | Specht | ............... | B60R 22/1952 60/632 |
| 5,911,440 A * | 6/1999 | Ruddick | ............. | B60R 22/1952 280/806 |
| 6,113,145 A * | 9/2000 | Evans | ................. | B60R 22/1952 297/480 |
| 6,186,549 B1 * | 2/2001 | Specht | ............... | B60R 22/1952 60/632 |

(Continued)

*Primary Examiner* — Barry Gooden, Jr.
(74) *Attorney, Agent, or Firm* — Gordon Rees Scully Mansukhani, LLP

(57) ABSTRACT

A seat belt system for restraining an occupant of a vehicle. The system includes a webbing and a pretensioner. A cable connects the webbing to the pretensioner. The pretensioner includes a housing, a gas generator, and an outer cylinder connected to the housing. A gas generator provides gases into a pressure chamber in the outer cylinder to drive a piston, an inner cylinder and the cable in a pretensioning direction. A sealing ring is located between the outer cylinder and inner cylinder. The sealing ring is configured to provide a seal to prevent the gases provided by the gas generator from passing. A deflector shield is located between the outer cylinder and the inner cylinder and closer to the pressure chamber than the sealing ring, wherein the deflector shield is configured to deflect the gases away from the sealing ring.

19 Claims, 9 Drawing Sheets

(56) References Cited

U.S. PATENT DOCUMENTS

| | | | | |
|---|---|---|---|---|
| 6,676,161 B2* | 1/2004 | Schwald | ............ | B60R 22/1952 |
| | | | | 297/480 |
| 6,682,097 B2* | 1/2004 | Krauss | .................... | H02G 1/08 |
| | | | | 280/806 |
| 7,380,832 B2* | 6/2008 | Gray | .................. | B60R 22/1955 |
| | | | | 60/632 |
| 7,976,066 B2* | 7/2011 | Bok | .................... | B60R 22/1952 |
| | | | | 297/480 |
| 7,997,620 B1* | 8/2011 | Dong | ...................... | B60R 22/03 |
| | | | | 280/805 |
| 8,585,090 B2* | 11/2013 | Lane, Jr. | ............. | B60R 22/1955 |
| | | | | 297/480 |
| 2003/0011186 A1* | 1/2003 | Schwald | ............ | B60R 22/1952 |
| | | | | 280/806 |
| 2003/0075914 A1* | 4/2003 | Kohlndorfer | ........... | B60R 22/03 |
| | | | | 280/808 |
| 2006/0220369 A1* | 10/2006 | Gray | .................. | B60R 22/1955 |
| | | | | 280/806 |
| 2011/0121621 A1* | 5/2011 | Masutani | ............ | B60N 2/4221 |
| | | | | 297/216.1 |
| 2011/0316265 A1* | 12/2011 | Lane, Jr. | ............. | B60R 22/1955 |
| | | | | 280/806 |
| 2016/0368451 A1* | 12/2016 | Kacprzak | ............ | B60R 22/4619 |
| 2020/0254964 A1* | 8/2020 | Okubo | ................ | B60R 22/4628 |
| 2021/0213907 A1* | 7/2021 | Krauss | ................ | B60R 22/1955 |
| 2021/0229625 A1* | 7/2021 | Gray | .................. | B60R 22/4628 |
| 2022/0203929 A1* | 6/2022 | Gray | .................. | B60R 22/4604 |

* cited by examiner

SEAT BELT PRETENSIONER SYSTEM

CROSS REFERENCE TO RELATED APPLICATION

This application claims priority to and the benefit of U.S. Provisional Patent Application No. 62/976,918, filed on Feb. 14, 2020. The foregoing provisional application is incorporated by reference herein in its entirety.

GENERAL DESCRIPTION

This application relates to a pretensioner and a seat belt system.

A seat belt system in a vehicle may include a pretensioner that pulls on a webbing that restrains the vehicle occupant. The pretensioner is activated at the time of a vehicle collision to increase the restraining force of the occupant. The pretensioner may include a hollow cylinder that houses a cable. The cable extends out from the cylinder and has one end that is operatively connected to the webbing and a piston on the other end of the cable housed inside the cylinder. A gas generator is incorporated to supply gas to the cylinder in order to drive the piston thereby pulling the cable in the pretensioning direction. In some conventional designs, during the pretensioning operation, hot gases from the gas generator may leak past the piston and/or out of the cylinder and may reduce the effectiveness of the pretensioner system and also potentially release hot, pressurized gas into the vehicle environment.

An object of the disclosed seat belt system is to provide an improved pretensioner system that reduces the likelihood of hot gases escaping the pretensioner. The improved system is described in more detail below.

SUMMARY

According to a disclosed embodiment, a seatbelt pretensioner for a seat belt system of a vehicle is provided. The pretensioner includes a cable connected to the seatbelt at a first end of the cable. The pretensioner further includes inner and outer cylinders, wherein the inner cylinder is contained inside the outer cylinder and is configured to house a gas generator and the second end of the cable. The inner cylinder includes radial holes configured to allow gases produced by the gas generator to exit the inner cylinder and provide pressure for driving the inner cylinder in a pretensioning direction. A sealing ring is located between the outer cylinder and inner cylinder, wherein the sealing ring is configured to provide a seal to prevent the gases from passing. The pretensioner also includes a deflector shield located adjacent to the radial holes, wherein the deflector shield is located radially outward of the inner cylinder and is configured to deflect the gases away from the sealing ring.

According to a disclosed embodiment, the deflector shield may include a sloped surface, wherein one end of the sloped surface overhangs the radial opening of the inner cylinder. The gas generator may be housed within and located at a first end of the inner cylinder. The sealing ring is preferably located closer to the first end of the inner cylinder than the deflector shield. The inner cylinder may include an outward protrusion located between the deflector shield and the sealing ring. The cable may be inserted into the inner cylinder at a second end opposite of the first end of the inner cylinder. A cable holder may be located in the inner cylinder. The cable may be formed by a wound or compacted rope.

According to another embodiment, the pretensioner may include a piston. The inner cylinder and the cable may be configured to be driven in the pretensioning direction by the piston when the gas generator is activated in response to an acceleration of the vehicle greater than a predetermined high acceleration. The piston is configured to prevent movement of the inner cylinder in a direction opposite to the pretensioning direction. The outer surface of the piston may be ramped and have an increasing diameter in the pretensioning direction, and wherein the pretensioner includes one or more balls located between the ramped outer surface and the outer cylinder to thereby prevent movement of the piston in a direction opposite to the pretensioning direction.

According to another disclosed embodiment a pretensioner for a seat belt device in a vehicle is provided. The pretensioner includes a housing and a gas generator. An outer cylinder is connected to the housing, and a piston is movably located within the outer cylinder. An inner cylinder is movably located within the outer cylinder. A cable is connected to the seat belt device at one end, a second end of the cable is located in the inner cylinder. The gas generator is configured to provide gas into a pressure chamber located inside of the outer cylinder and adjacent the piston. The inner cylinder and the cable are configured to be driven in the pretensioning direction by the piston when the gas generator is activated in response to an acceleration of the vehicle greater than a predetermined high acceleration. A sealing ring may be located between the outer cylinder and inner cylinder, wherein the sealing ring is configured to provide a seal to prevent the gases provided by the gas generator from passing. A deflector shield is located between the outer cylinder and the inner cylinder and closer to the pressure chamber than the sealing ring, wherein the deflector shield is configured to block the gases from reaching the sealing ring.

According to another disclosed embodiment, the gas generator may be located in the inner cylinder and the inner cylinder may include radial holes to allow gases provided by the gas generator to escape from the inner cylinder into the pressure chamber. The deflector shield may be located adjacent to the radial holes. A cable holder may be attached to the second end of the cable, and may be located in the inner cylinder.

According to another disclosed embodiment a seat belt system for restraining an occupant of a vehicle is provided. The system includes a webbing and a pretensioner, and the pretensioner includes a housing and a gas generator. The pretensioner also includes an outer cylinder connected to the housing, and a piston movably located within the outer cylinder. A cable is connected to the webbing at one end and a second end of the cable is located in an inner cylinder that is movably located within the outer cylinder. A gas generated is located in the inner cylinder, and the gas generator is configured to provide gas into a pressure chamber located outside of the inner cylinder and inside of the outer cylinder. The inner cylinder and the cable are configured to be driven in the pretensioning direction by the piston when the gas generator is activated. A sealing ring is located between the outer cylinder and inner cylinder. The sealing ring is configured to provide a seal to prevent the gases provided by the gas generator from passing. A deflector shield located between the outer cylinder and the inner cylinder and closer to the pressure chamber than the sealing ring. The deflector shield is configured to deflect the gases away from the sealing ring. The deflector shield may be located adjacent to the radial holes. The pretensioner may include a cable holder located in the inner cylinder and attached to the second end of the cable.

It is to be understood that the foregoing general description and the following detailed description are exemplary and explanatory only, and are not restrictive of the invention as claimed.

BRIEF DESCRIPTION OF THE DRAWINGS

The features, aspects, and advantages of the disclosed system will become apparent from the following description, and the accompanying exemplary embodiments shown in the drawings, which are briefly described below.

DETAILED DESCRIPTION

According to one embodiment of the disclosure, a pretensioner for a seat belt system in a vehicle is disclosed. The pretensioner includes a cable connected to the seatbelt or webbing of the seat belt system at a first end of the cable. The pretensioner includes a housing or outer cylinder, and a second end of the cable is housed within the outer cylinder. A gas generator is contained within the outer cylinder. The gas generator is located in a cylindrical housing or inner cylinder that includes radial holes configured to allow the generated gases to exit. When the gas generator is initiated, the inner cylinder is driven to change position relative to the outer cylinder to pull the cable. The cable is connected to a holder or piston located within the inner cylinder. The gas generator may initiate in response to an acceleration of the vehicle greater than a predetermined high acceleration. A sealing ring (e.g., an O-ring) is located between the outer cylinder and inner cylinder, wherein the sealing ring is configured to provide a seal to prevent the hot gases from passing by one end of the inner cylinder and potentially escaping from the pretensioner. A deflector shield is located upstream of the sealing ring and adjacent to the radial holes. The deflector shield is located radially outward of the inner cylinder and is configured to deflect the hot gases away from the sealing ring and further reduce the likelihood of gas escaping from the pretensioner.

Figure 1:
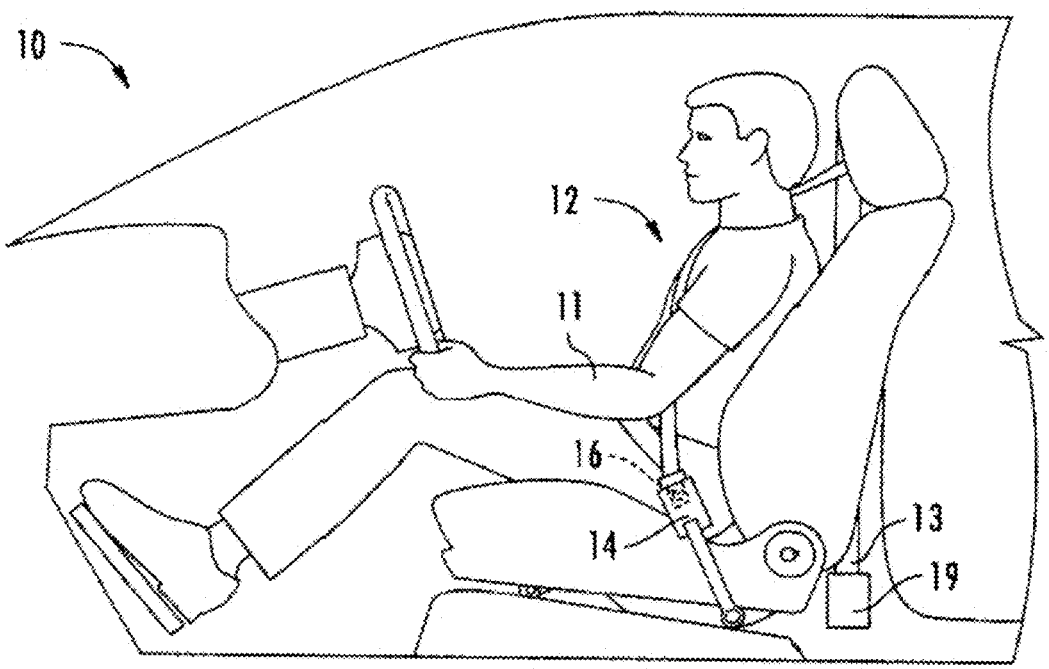
FIG. 1 is a left side view of a vehicle showing a seat belt system including a pretensioner device.
Figure 2:
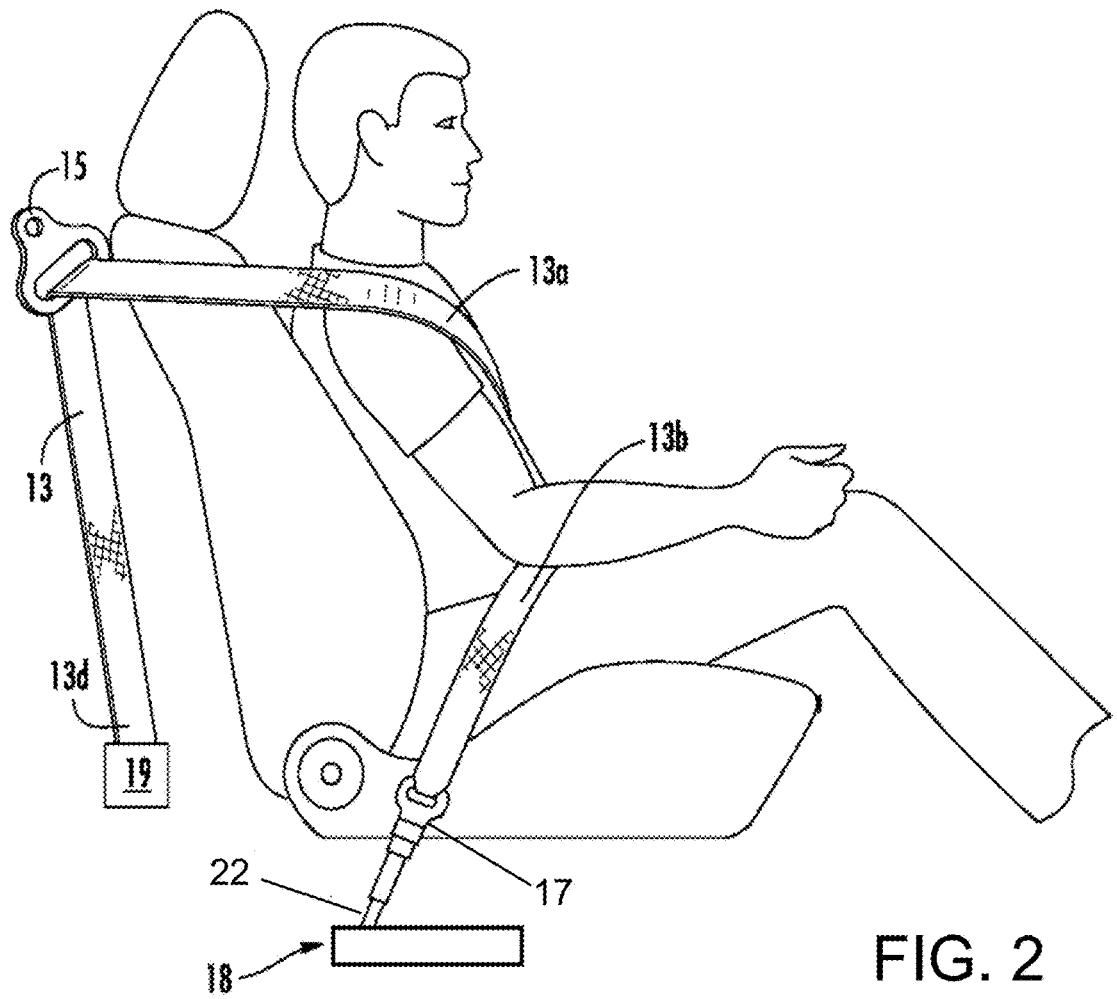
FIG. 2 is a right side view of the seatbelt system of FIG. 1.

FIGS. 1 and 2 illustrate an exemplary embodiment of a vehicle 10 having an interior compartment that is configured to provide seating to an occupant 11. The vehicle 10 includes a seat belt assembly 12 that is configured to secure (e.g., restrain) the occupant 11 when seated in a seat assembly of the vehicle 10.

As shown in the figures, the seat belt assembly 12 (e.g., seat belt system, occupant restraint device, etc.) includes a seat belt 13 (e.g., a webbing) having a shoulder portion 13a and a lap portion 13b that are separated by a tongue member 16 that is configured to selectively (e.g., releasably) engage a buckle mechanism 14. The lap portion 13b of the seat belt 13 is configured to generally wrap around the lap of the occupant 11 to restrain the lower portion of the occupant 11 during a dynamic vehicle event. The lap portion 13b may extend to the tongue member 16 and is configured to be fixed, such as, for example, to a pretensioning device 18 (e.g., a pretensioner) via an anchor 17. The shoulder portion 13a of the seat belt 13 is configured to generally wrap around the torso and shoulder of the occupant to restrain the torso or thorax of the occupant during a dynamic vehicle event. The lap portion 13b and the shoulder portion 13a may form a continuous length of webbing.

The shoulder portion 13a may have an end 13d that is configured to be secured, for example retractably secured, to a retractor 19. The seat belt 13 is configured to wind (e.g., retract) and unwind (e.g., extract) about the retractor 19. The retractor 19 may be integrated with the seat or attached to the vehicle 10. The seat belt assembly 12 may also include a guide 15 (e.g., a D-ring, etc.) for guiding the direction of the shoulder portion 13a of the seat belt 13. The seat belt assembly 12 may have any suitable configuration and may include fewer or additional components to restrain and secure an occupant in a vehicle, and the example disclosed in the figures is not intended to be limiting.

When activated, the pretensioner 18 is configured to tension the seat belt 13, such as during a dynamic vehicle event (e.g., a frontal impact or other crash event), by removing an amount of slack between the seat belt 13 and the occupant 11 that is present at the onset of the dynamic vehicle event. For example, the pretensioner 18 may pull the cable 22 to thereby displace the end of the seat belt 13 a corresponding distance to remove slack between the occupant 11 and the seat belt 13. The seat belt assembly 12 may include a controller that receives input from one or more sensors (not shown) configured to detect an emergency event (e.g. vehicle collision). The sensors may be acceleration sensors. Although described herein as an anchor mounted pretensioner, the embodiments of the pretensioning device disclosed and described herein may be mounted to the buckle 14.

Figure 3:
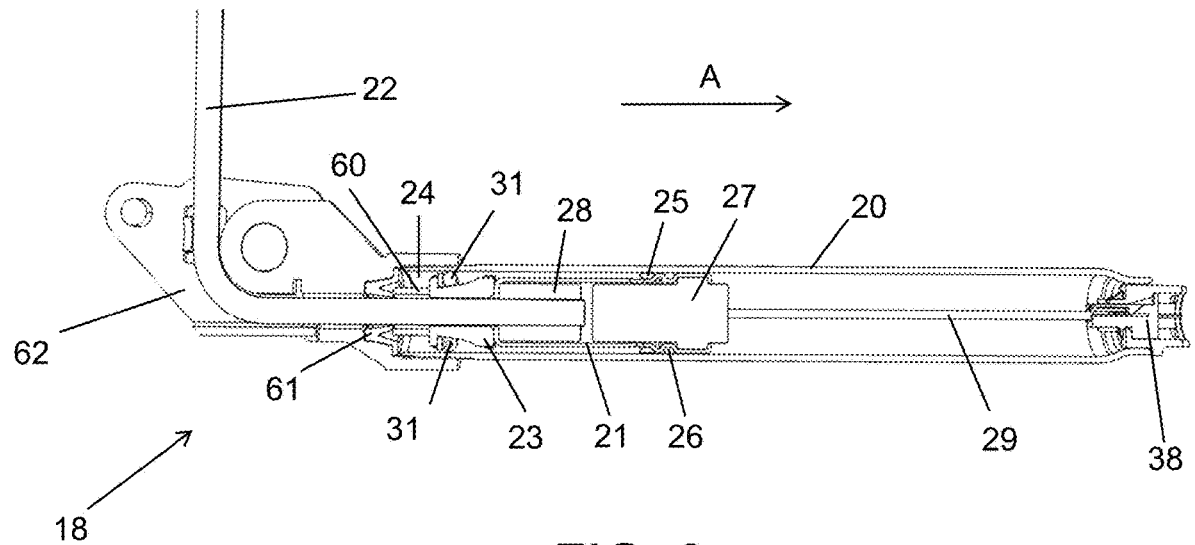
FIG. 3 is a cutaway view of the pretensioning device shown in FIG. 2.
Figure 4:
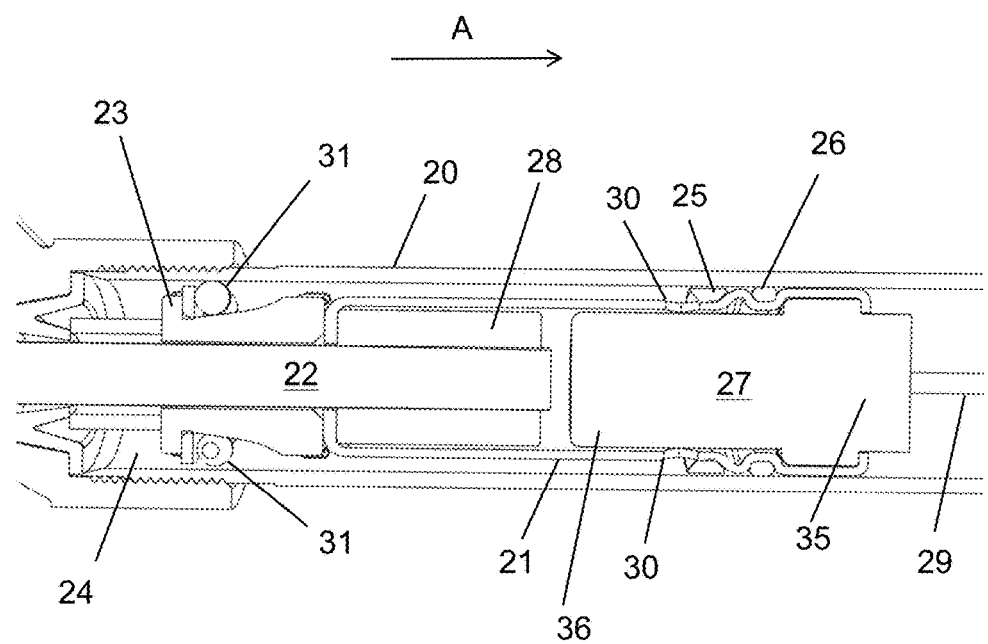
FIG. 4 is a close up of the pretensioning device shown in FIG. 3.

FIGS. 3 and 4 show the internal components of the pretensioner 18. The pretensioner includes an outer cylinder 20 that houses an end of the cable 22. One end of the cylinder 20 is connected to a housing 62. As shown, a threaded connection may be used. Cable 22 passes through housing 62 and is attached to a cable holder 28 located inside and at one end of an inner cylinder 21. The cable passes through an opening in the inner cylinder 21 in order to connect to the cable holder 28. A gas generator 27 is located at an end of inner cylinder 21 opposite of the cable holder 28. The gas generator may be a pyrotechnic type gas generator and may include an initiator 35 and a propellant 36 that are stored in separate portions of the gas generator 27. The gas generator 27 may be formed as an aluminum tube or can containing the initiator and the propellant. The gas generator 27 may be located coaxial with the cable 22 and a piston 23. The piston 23 is configured to push the inner cylinder 21 when driven by the force resulting from gases escaping from the gas generator 27. A lead wire 29 or other suitable element is operatively connected to the gas generator 27 and an electrical connector 38 and may be configured to carry an electrical signal for triggering the initiation of the gas generator 27.

The inner cylinder 21 includes one or more radial holes 30 arranged annularly around the circumference of the inner cylinder 21. The radial holes 30 are configured to allow gas from the gas generator 27 to be released into the pressure chamber 24 in order to push the piston 23. The gas is typically hot gas, but the gas generator may be configured to release gas at lower temperatures. A spacer 60 is located between a protective seal 61 and the piston 23 in order to create the volume for the pressure chamber 24. The movement of the piston 23 in the cylinder 20 drives the inner cylinder 21 in order to pull the cable 22 in the pretensioning direction 'A' during a dynamic vehicle event in order to remove slack between the occupant and the seatbelt. The protective seal 61 is positioned at an end of the outer cylinder 20 and housed inside the housing 62. This protective seal 61 assists the sealing of hazardous gases from escaping the pretensioner 18. The arrangement of the protective seal 61, outer cylinder and the housing 62, prevents the protective seal 61 from moving during the pulling of the cable 22 in the pretension direction 'A' during a dynamic vehicle event. The outer cylinder may abut the seal 61 to maintain the seal in a seated position in the housing 62.

A sealing ring 26 is located in an annular groove 21c (See FIG. 5) arranged around the circumference of the inner cylinder 21. The sealing ring contacts an inner surface of the outer cylinder 20 and an outer surface of inner cylinder 21 to provide a seal to prevent hot gases from escaping the pressure chamber 24. The sealing ring may be configured to expand when exposed to the hot gases from the gas generator and, thus, provides an increasingly better seal as time elapses following the initiation of the gas generator.

A deflector shield 25 is disposed around the inner cylinder 21 in a direction opposite of the pretensioning direction "A" relative to the sealing ring 26. The deflector shield 25 reduces the likelihood of hot gases exiting the pressure chamber 24 by blocking or deflecting hot gases away from the sealing ring. The presence of the deflector shield 25 reduces the likelihood of the gases escaping from the pretensioner at the end of the pretensioner containing the electrical connector 38 for connecting the pretensioner (in particular, the initiator of the gas generator) to the safety control system and related controller. The deflector shield 25 may be formed of a material configured to be destroyed or melted by the hot gases released by the gas generator 27. The deflector shield 25 serves as a shield or a barrier protecting the sealing ring 26 at the onset of the pretensioning event to prevent the sealing ring 26 from being exposed directly to hot gases before the sealing ring 26 has had time to fully expand and form a tight seal. By the time the deflector shield 25 is destroyed or melted from the hot gases, the sealing ring 26 will have formed a tight seal to prevent the escape of gases from the inflator. The deflector shield 25 may be made of synthetic polymer polyoxymethylene (POM) (i.e. acetal, polyacetal, and polyformaldehyde). Other suitable materials that can sustain long enough for the sealing ring 26 to expand to properly seal the pressure chamber 24 may be utilized.

The pretensioner 18 may include balls 31 disposed outside of piston 23 in order to prevent piston 23 from moving in the opposite direction of pretensioning direction 'A' once the gas generator has been activated (e.g. during a dynamic vehicle event). The balls 31 will engage ramps of piston 23 if a force is imparted that pulls the cable 22 opposite of the pretensioning direction during and after the pretensioning event to prevent the extraction of the cable out of the outer cylinder 20. The ramps provide the piston with an increasing diameter in the pretensioning direction, and the balls are located between the ramped outer surface of the piston and the outer cylinder.

Figure 5:
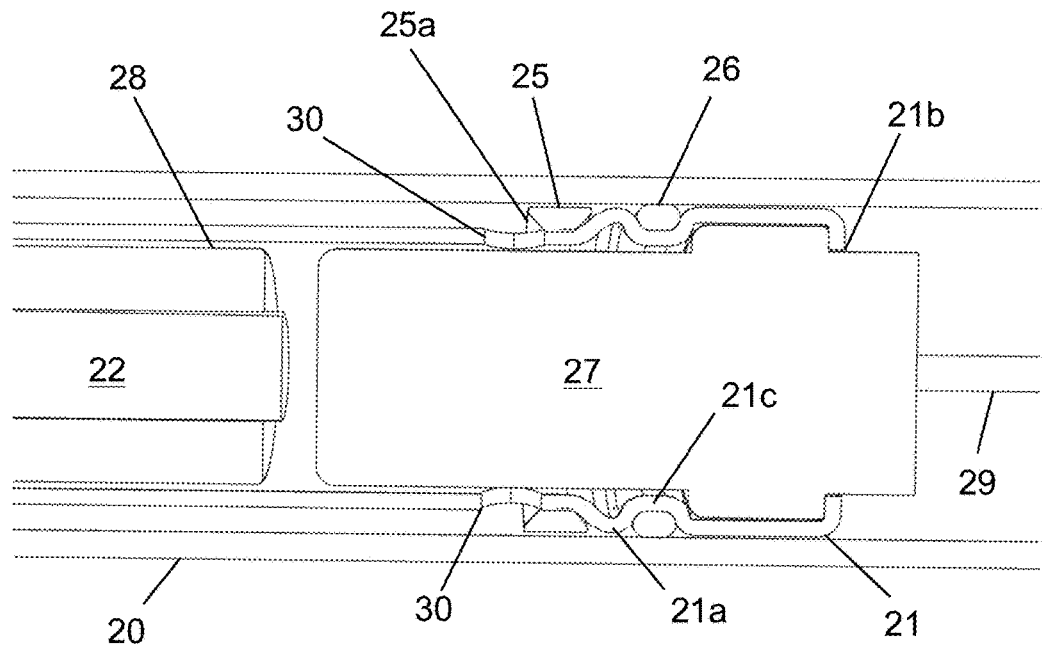
FIG. 5 is a close up of the pretensioning device shown in FIG. 4.
Figure 6:
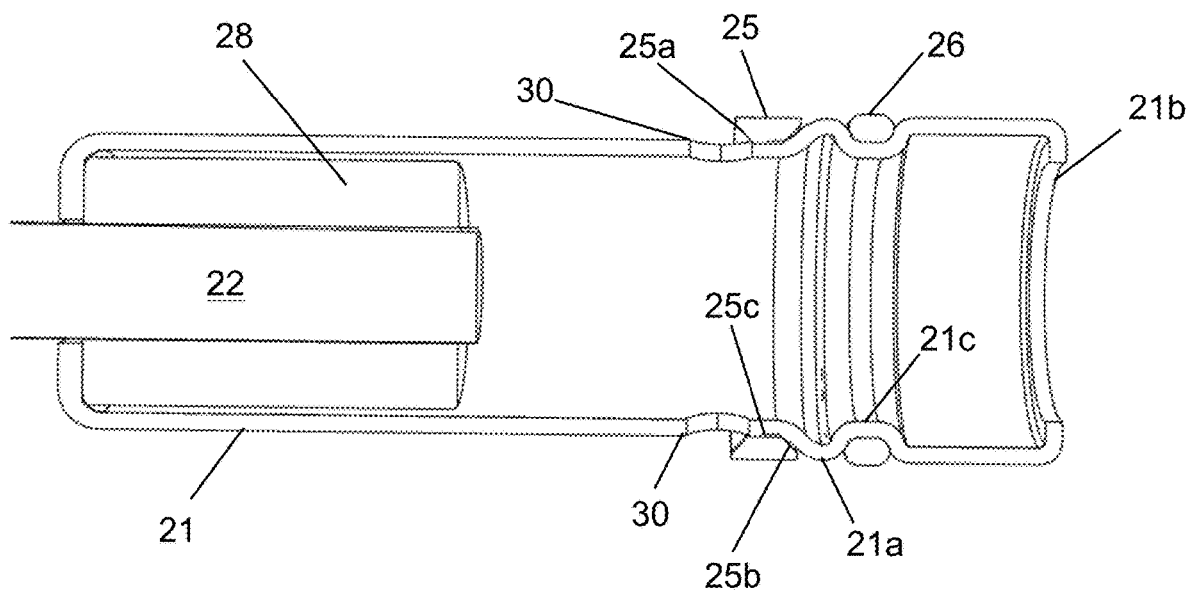
FIG. 6 is an isolated view of an inner cylinder of the pretensioning device shown in FIG. 2.

As shown in FIGS. 5 and 6, the deflector shield 25 is disposed directly adjacent and may be radially outwards of the radial holes 30. The deflector shield includes a first sloped surface 25a that is configured to deflect hot gases exiting radial holes 30 away from the sealing ring 26. One end of sloped surface 25a may be adjacent to the opening 30 so that as the surface 25a extends away from the opening, a portion of the surface 25a overhangs or overlies a portion of the opening 30. The inner cylinder 21 may comprise a protrusion 21a extending radially outwards and located directly between the sealing ring 26 and the deflector shield 25. The deflector shield 25 may include a second sloped surface 25b configured to engage the protrusion 21a of the inner cylinder. An inner surface 25c of the deflector shield 25 is configured to engage the outer surface of the inner cylinder 21. An opening 21b at a first end of the inner cylinder 21 may be provided for receiving the gas generator 27. The shape of the deflector shield 25 may vary. For example, instead of a sloped surface, the deflector shield may have a rectangular cross or other suitable shape including a curved surface.

Figure 7:
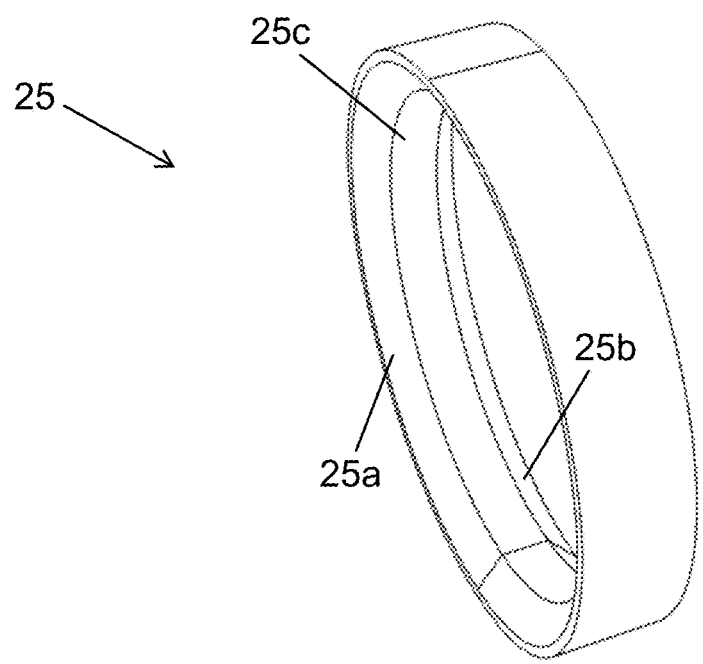
FIG. 7 is an isolated view of a deflector shield of the pretensioning device shown in FIGS. 2 and 6.
Figure 8:
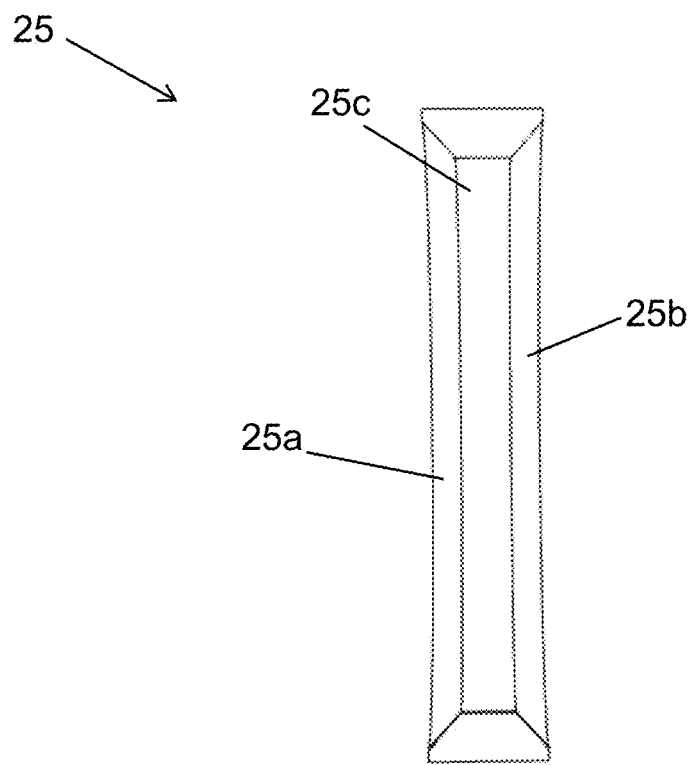
FIG. 8 is a sectional view of the deflector shield shown in FIG. 7.

FIGS. 7 and 8 show the details of the surfaces 25a, 25b, and 25c (described above) of the deflector shield 25.

Figure 9:
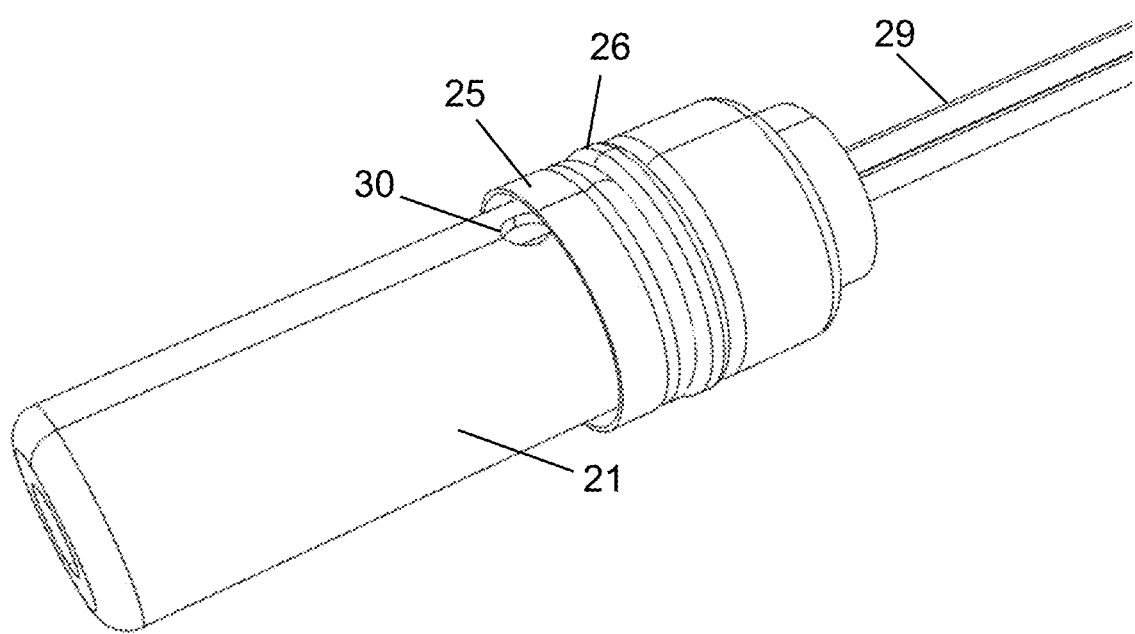
FIG. 9 is an isometric view of the inner cylinder shown in FIG. 3.
Figure 10:
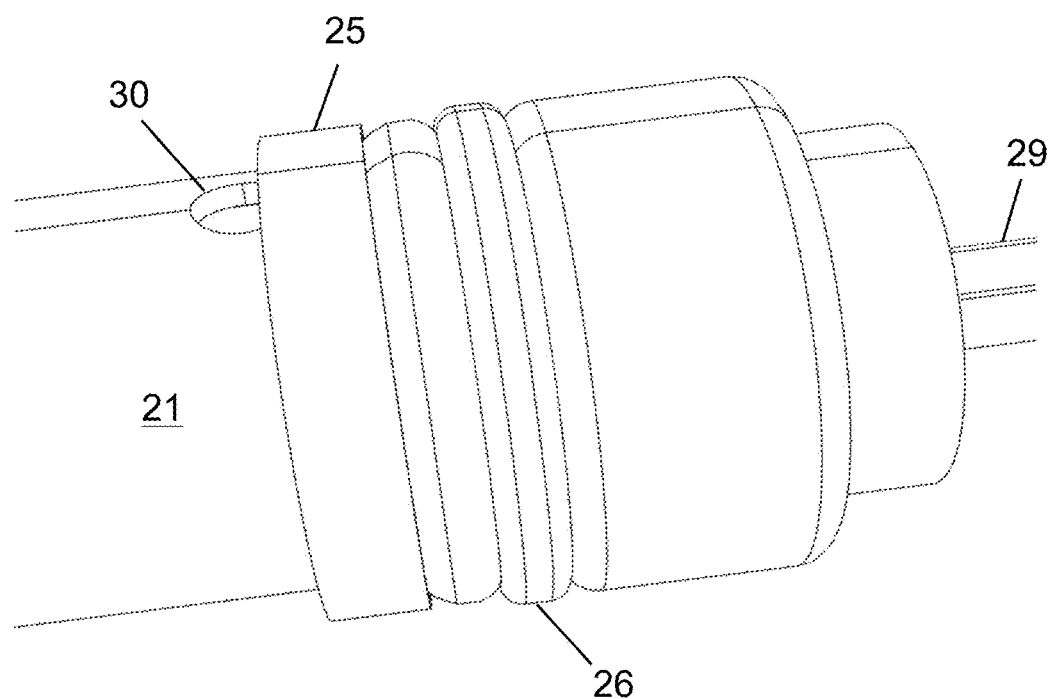
FIG. 10 is an isometric view of the inner cylinder shown in FIG. 3.

FIGS. 9 and 10 show the inner cylinder 21 and positions of the sealing ring 26 and the deflector shield 25.

Figure 11:
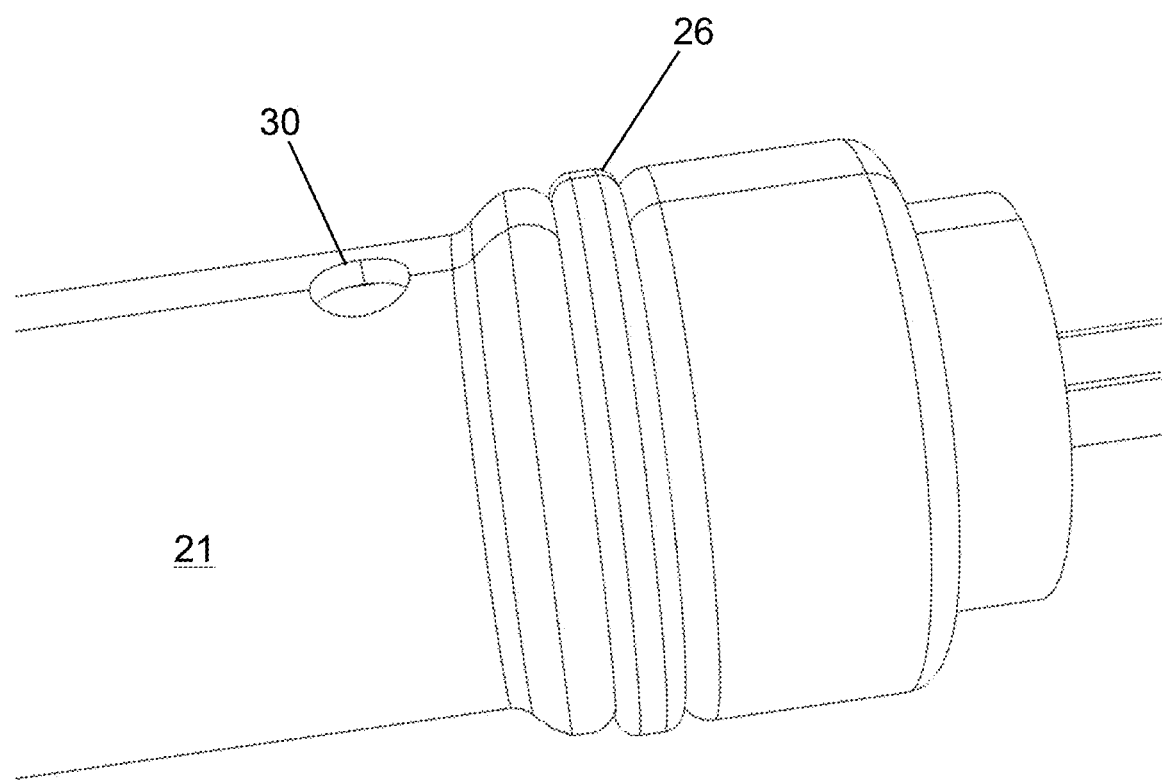
FIG. 11 is an isometric view of the inner cylinder shown in FIG. 3 with the deflector shield omitted.

FIG. 11 shows the inner cylinder 21 and the sealing ring 26 with the deflector shield omitted.

Figure 12:
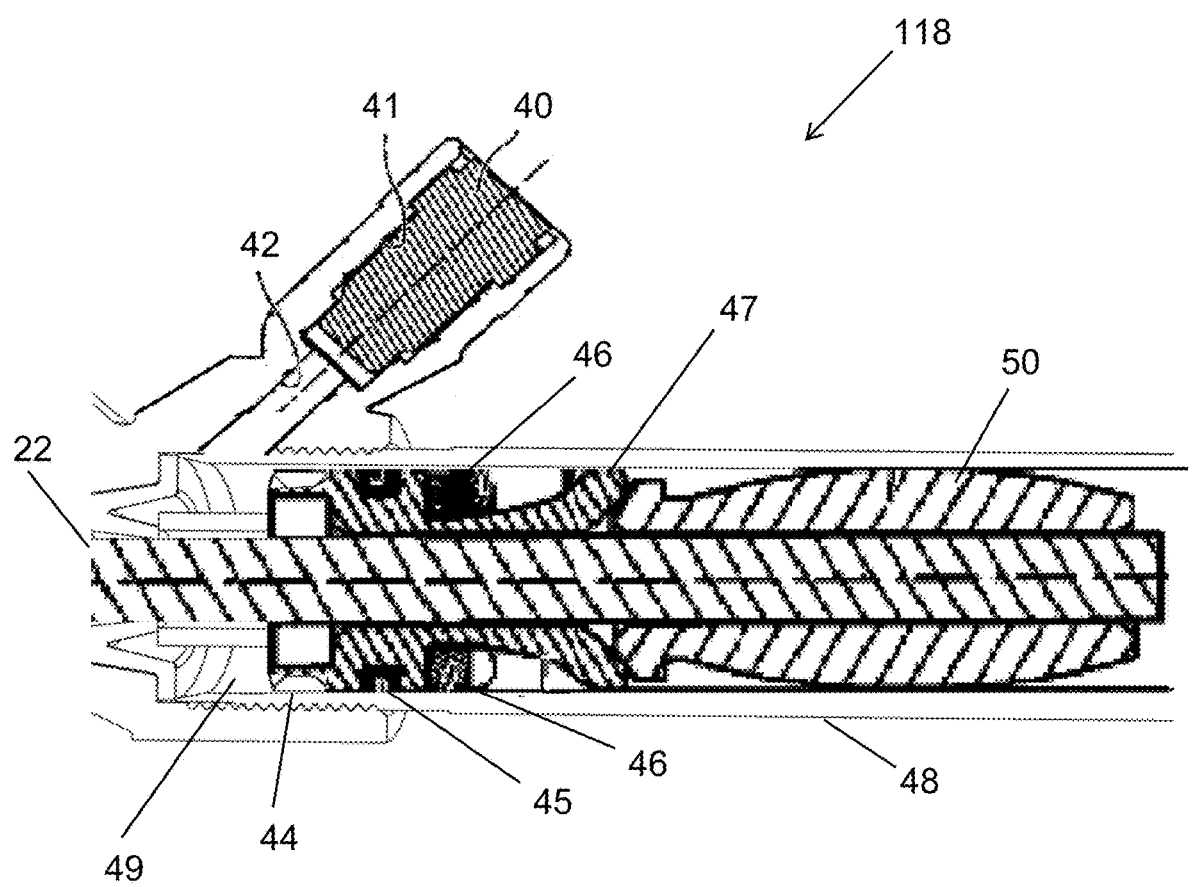
FIG. 12 is another exemplary embodiment of a pretensioning device.

FIG. 12 shows another embodiment of a pretensioner 118. Pretensioner 118 is configured in a non-linear arrangement and is an alternative to pretensioner 18. A gas generator 40 is located in an external housing 41 and is configured to provide hot gas into a pressure chamber 49. A cable 22 may be housed in the cylinder 48 and held by a cable holder A sealing ring 45 is configured to seal hot gases in the pressure chamber 49 during the pretensioning event. A deflector shield 44 may be placed upstream of the sealing ring 45 in order to deflect hot gas away from the sealing ring 45. Balls 46 may be provided to engage the piston 47 in order to lock the cable from extracting out of the cylinder 48. A transfer chamber 42 connects the gas generator 40 to the pressure chamber 49. The deflector shield 44 may be configured in a similar manner to the deflector shield described above and shown in FIGS. 3-10.

Figure 13:
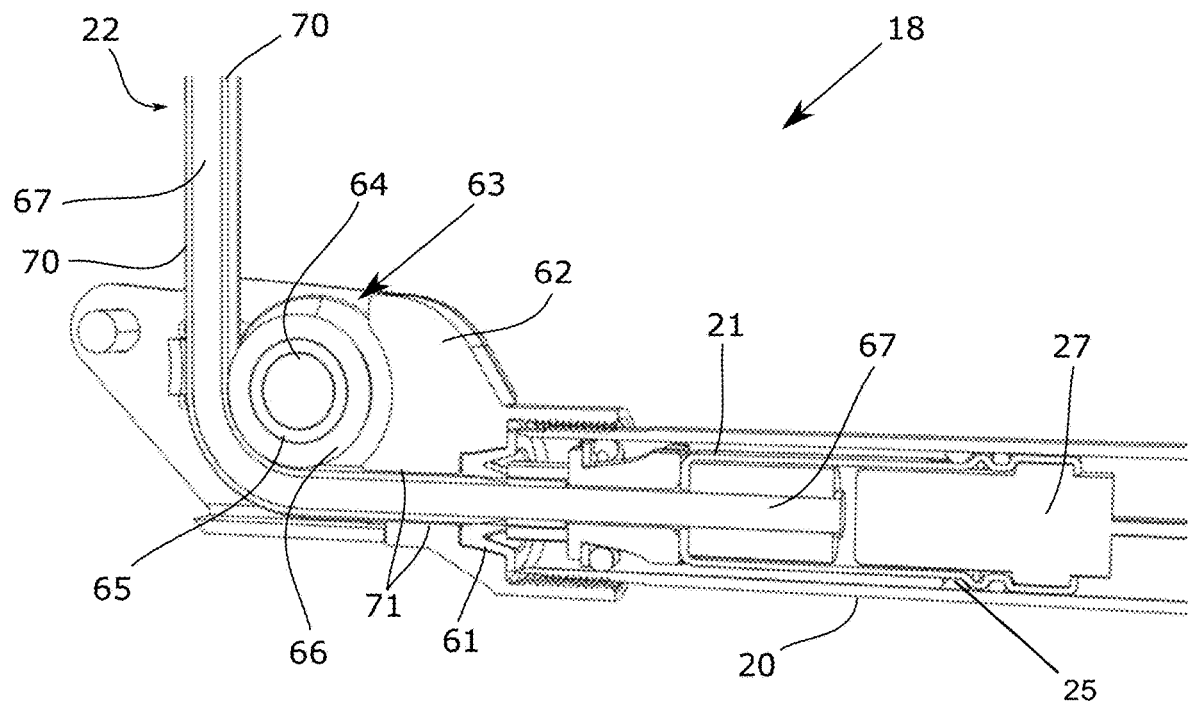
FIG. 13 is a cutaway view of another exemplary embodiment of a pretensioning device.
Figure 14:
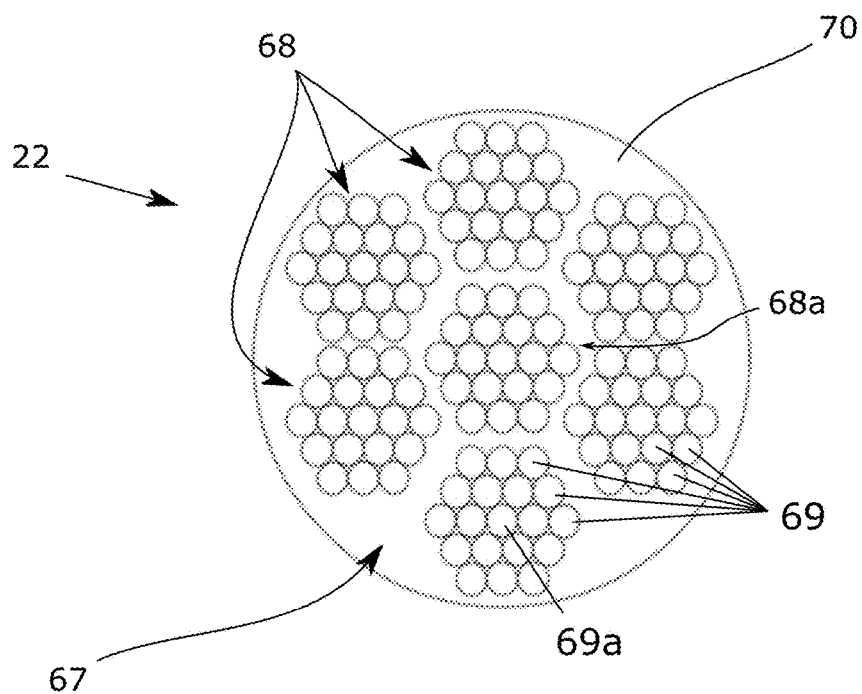
FIG. 14 is a cross-sectional view of an exemplary cable used in the pretensioning device of FIG. 13.

In another exemplary embodiment, the housing 62 may contain a roller assembly 63, as shown in FIG. 13. The roller assembly includes a roller axle 64, a low friction sleeve 65 and an outer roller 66. As shown in FIG. 14, the exemplary cable 22 shown may be a wound rope 67 having strands 68 comprising individual wires 69 arranged together in a helical manner around a center wire 69*a*. Each strand 68 is also arranged in a helical manner around a center strand 68*a*. Other cable winding configurations can be provided such as a rope without a center strand and/or non-helically wound strands. The cable 22 includes an outer coat 70 surrounding the rope 67. The outer coat 70 provides an improved sliding sealing interface with adjacent cable surfaces such as the housing surface 71 and the outer roller 66. The outer coat 70 comprises a smooth outer surface and aids in the sealing of hazardous gases from escaping the pretensioner. The roller assembly 63 is a low friction roller that assists the displacement of the cable 22 and prevents damage to the coating during the pretensioning event.

Figure 15:
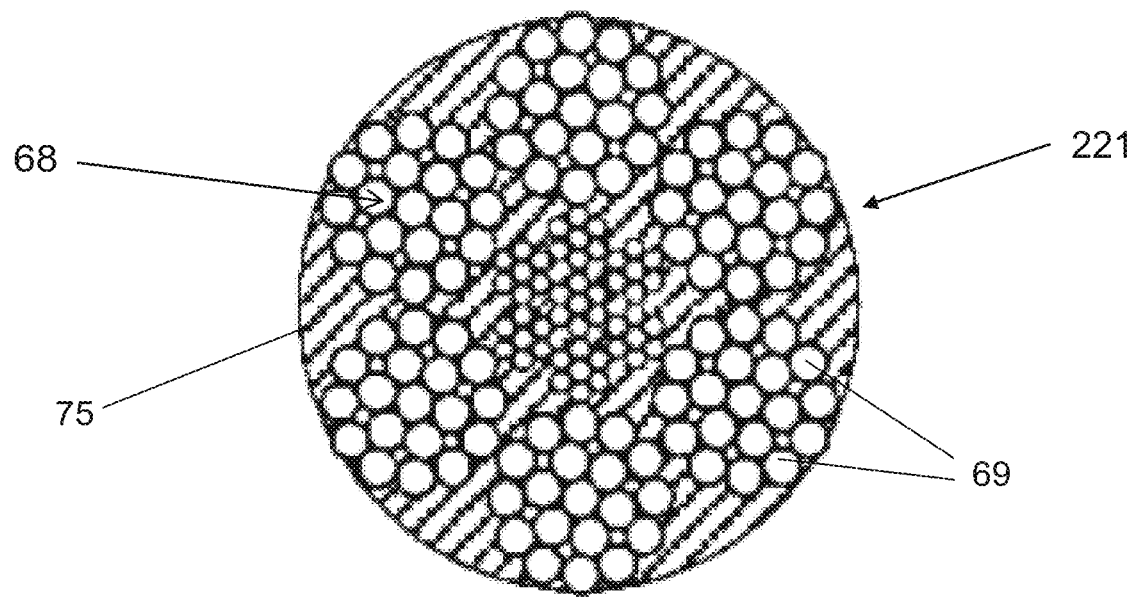
FIG. 15 is a cross-sectional view of another embodiment of an exemplary cable used in the pretensioning device of FIG. 13.
Figure 16:
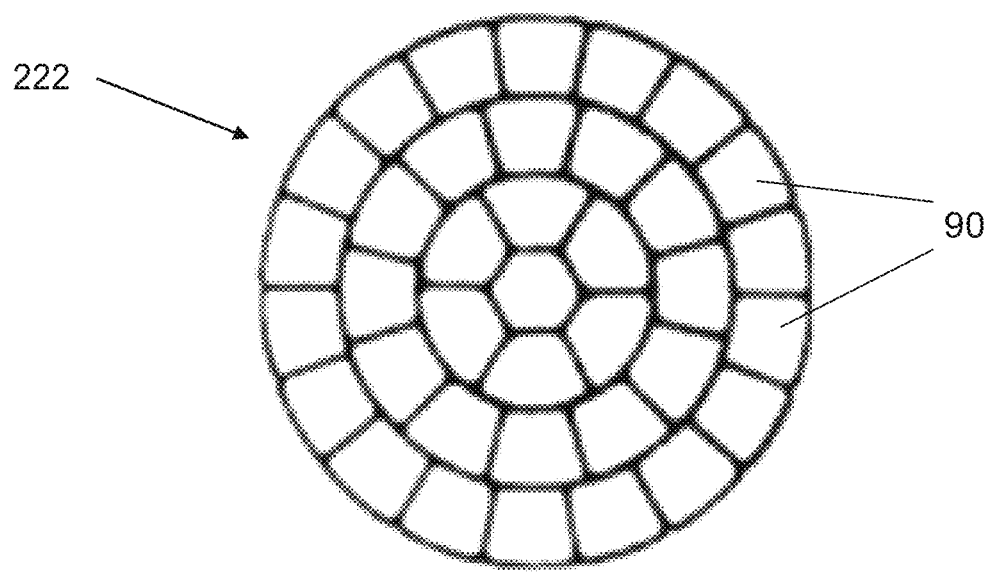
FIG. 16 is a cross-sectional view of a further embodiment of an exemplary cable used in the pretensioning device of FIG. 13.

FIGS. 15 and 16 show alternative embodiments for the cable 22 to be used in the pretensioner. For example, FIG. 15 shows a cable 221 that includes a wound rope having individual wire strands 69, but also includes a plastic filler 75 located between the strands of the rope. The internal spaces in the cable are filled by the plastic material 75. The cable 221 shown in FIG. 15 may be formed with a smaller outer diameter than the cable 22 shown in FIG. 14, because the outer coating is eliminated and the strands may be located at the perimeter of the cable 221. FIG. 16 shows a cable 222 formed by compacting strands of wire 90. The cable 222 includes individual wire strands 90 that may be compacted during the manufacturing process. The cable 222 is passed through a die or rollers to compact the strands and eliminate any air gaps and increase contact between the strands. The cable 222 is formed by compacting either or both of the inner and outer strands of the cable. As shown, in FIG. 16 all the strands of the cable are compacted.

In sum, the pretensioner configuration described herein and disclosed in the drawings is configured to reduce the likelihood of gas escaping from the pretensioner.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the pretensioner as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A seatbelt pretensioner for a seat belt system of a vehicle, the pretensioner comprising:
   a cable connected to the seatbelt at a first end of the cable;
   an outer cylinder, wherein a second end of the cable is located within the outer cylinder;
   an inner cylinder contained inside the outer cylinder configured to house a gas generator and the second end of the cable;
   wherein the inner cylinder includes radial holes configured to allow gases produced by the gas generator to exit the inner cylinder and provide pressure for driving the inner cylinder in a pretensioning direction;
   a sealing ring located between the outer cylinder and the inner cylinder, wherein the sealing ring is configured to provide a seal to prevent the gases from passing; and
   a deflector shield located adjacent to the radial holes, wherein the deflector shield is located radially outward of the inner cylinder and is configured to deflect the gases away from the sealing ring as the gas exits the inner cylinder.

2. The seatbelt pretensioner of claim 1, wherein the deflector shield includes a sloped surface, wherein one end of the sloped surface overhangs the radial holes of the inner cylinder.

3. The seatbelt pretensioner of claim 1, wherein the gas generator is housed within and located at a first end of the inner cylinder.

4. The seatbelt pretensioner of claim 3, wherein the sealing ring is closer to the first end of the inner cylinder than the deflector shield.

5. The seatbelt pretensioner of claim 3, wherein the cable is inserted into the inner cylinder at a second end opposite of the first end of the inner cylinder.

6. The seatbelt pretensioner of claim 5, further comprising a cable holder located in the inner cylinder.

7. The seatbelt pretensioner of claim 1, further comprising a piston located in the outer cylinder, wherein the inner cylinder and the cable are configured to be driven in the pretensioning direction by the piston when the gas generator is activated in response to an acceleration of the vehicle greater than a predetermined high acceleration.

8. The seat belt pretensioner of claim 7, wherein the piston is configured to prevent movement of the inner cylinder in a direction opposite to the pretensioning direction.

9. The seatbelt pretensioner of claim 8, wherein the outer surface of the piston is ramped and has an increasing diameter in the pretensioning direction, and wherein the pretensioner includes one or more balls located between the ramped outer surface and the outer cylinder to thereby prevent movement of the piston in a direction opposite to the pretensioning direction.

10. The seatbelt pretensioner of claim 1, wherein the inner cylinder includes an outward protrusion located between the deflector shield and the sealing ring.

11. The seatbelt pretensioner of claim 1, wherein the cable comprises a wound rope and a coating surrounding the rope.

12. A pretensioner for a seat belt device in a vehicle, the pretensioner comprising:
 a housing and a gas generator,
 an outer cylinder connected to the housing, and a piston movably located within the outer cylinder,
 a cable connected to the seat belt device at one end;
 an inner cylinder movably located within the outer cylinder, and wherein a second end of the cable is located in the inner cylinder,
 wherein the gas generator is configured to provide gas into a pressure chamber located inside of the outer cylinder and adjacent the piston;
 wherein the inner cylinder and the cable are configured to be driven in a pretensioning direction by the piston when the gas generator is activated in response to an acceleration of the vehicle greater than a predetermined high acceleration;
 a sealing ring located between the outer cylinder and the inner cylinder, wherein the sealing ring is configured to provide a seal to prevent the gases provided by the gas generator from passing;
 a deflector shield located between the outer cylinder and the inner cylinder and closer to the pressure chamber than the sealing ring, wherein the deflector shield is configured to block the gases exiting from holes in the inner cylinder from reaching the sealing ring; and
 wherein the deflector shield includes a sloped surface, wherein one end of the sloped surface overhangs the holes of the inner cylinder.

13. The pretensioner of claim 12, wherein the gas generator is located in the inner cylinder.

14. The pretensioner of claim 13, wherein the holes in the inner cylinder are radial holes.

15. The pretensioner of claim 14, wherein the deflector shield is located adjacent to the radial holes.

16. The pretensioner of claim 12, further comprising a cable holder attached to the second end of the cable, wherein the cable holder is located in the inner cylinder.

17. A seat belt system for restraining an occupant of a vehicle, the system including a webbing and a pretensioner, wherein the pretensioner comprises:
 a housing and a gas generator,
 an outer cylinder connected to the housing, and a piston movably located within the outer cylinder,
 a cable connected to the webbing at one end;
 an inner cylinder movably located within the outer cylinder wherein a second end of the cable and the gas generator are located within the inner cylinder,
 wherein the gas generator is configured to provide gas into a pressure chamber located outside of the inner cylinder and inside of the outer cylinder;
 wherein the inner cylinder and the cable are configured to be driven in a pretensioning direction by the piston when the gas generator is activated;
 wherein the inner cylinder includes radial holes to allow gases provided by the gas generator to escape from the inner cylinder into the pressure chamber;
 a sealing ring located between the outer cylinder and the inner cylinder, wherein the sealing ring is configured to provide a seal to prevent the gases provided by the gas generator from passing; and
 a deflector shield located between the outer cylinder and the inner cylinder and closer to the pressure chamber than the sealing ring, wherein the deflector shield is configured to deflect the gases away from the sealing ring.

18. The pretensioner of claim 17, wherein the deflector shield is located adjacent to the radial holes.

19. The pretensioner of claim 17, further comprising a cable holder attached to the second end of the cable, wherein the cable holder is located in the inner cylinder.

* * * * *